April 3, 1928.  C. G. BEWLEY  1,664,913
PLANT POTTING MACHINE
Filed Aug. 17, 1925   3 Sheets-Sheet 1

INVENTOR
CLAUDE G. BEWLEY
By
ATTORNEY

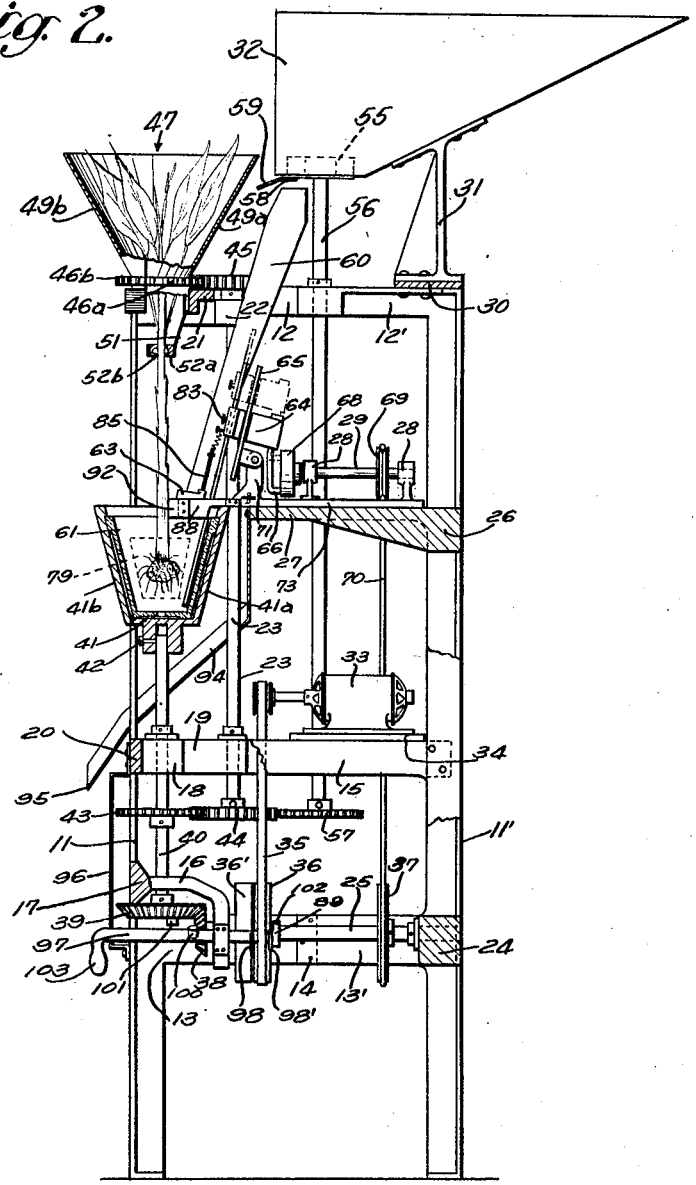

April 3, 1928.
C. G. BEWLEY
1,664,913
PLANT POTTING MACHINE
Filed Aug. 17, 1925
3 Sheets-Sheet 3
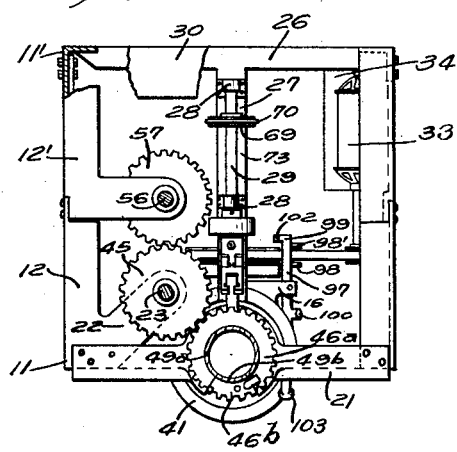
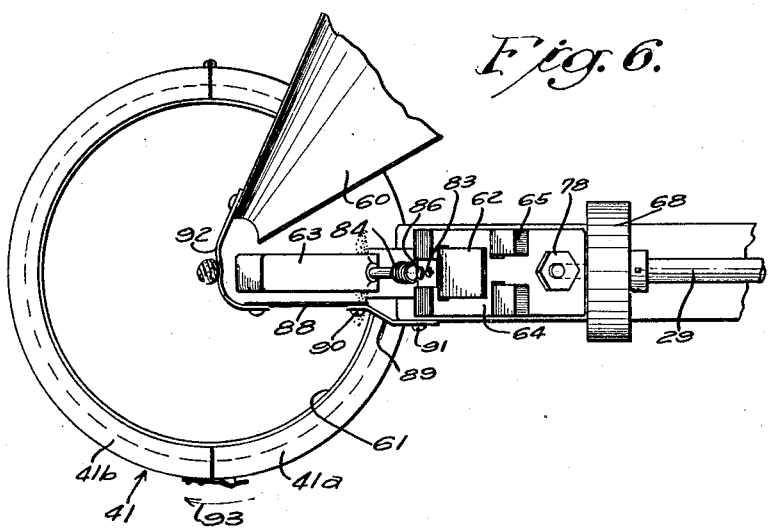
INVENTOR
CLAUDE G. BEWLEY
BY
ATTORNEY Patented Apr. 3, 1928.

1,664,913

UNITED STATES PATENT OFFICE.

CLAUDE G. BEWLEY, OF SPOKANE, WASHINGTON, ASSIGNOR OF ONE-HALF TO ROY F. WILCOX & CO., OF MONTEBELLO, CALIFORNIA, A COPARTNERSHIP CONSISTING OF ROY F. WILCOX, FRANCIS K. WILCOX, AND OSCAR KEELINE, AND ONE-HALF TO SPOKANE CONCRETE FLOWER POT MACHINE COMPANY, INC., OF SPOKANE, WASHINGTON, A CORPORATION OF WASHINGTON.

PLANT-POTTING MACHINE.

Application filed August 17, 1925. Serial No. 50,632.

My present invention being referred to as a plant potting machine and method, it may be understood to be an object of this invention to provide safe, expeditious and economical means and methods for the positioning of plants within suitable pots, or the like, to be filled with soil; and advantageous embodiments of my invention may comprise means for rotating together suitable pots and plants held upright relatively thereto during the feeding of a potting soil into said pots; and a preferred embodiment of this invention may comprise pot-holding and plant-holding means having laterally movable sections, and means permitting the same to be disposed favorably to the rapid positioning of pots and plants.

It is a further object of this invention to provide a potting organization comprising a tamping finger adapted to push soil beneath and to compact the same about the roots of a plant to be potted, or a tamper adapted to compact the upper layers of the soil fed, or both of these tampers; and I may use therewith, or independently thereof, means adapted to prevent over-filling, and to distribute and remove any excess of soil fed.

It is a further object of this invention to provide means for feeding soil at a predetermined rate into a pot during the simultaneous rotation of said pot and plant to be potted.

It is a further object of this invention to provide a plant potting machine comprising a suitable frame, drive means for the respective movable parts above mentioned, and means for transmitting motion, at desired rates, from said drive to said movable parts; and a preferred embodiment of my invention may comprise a frame cast in two main parts adapted to be secured together by auxiliary members and adapted to support a pot container and a plant holder in vertical alignment, and in a position favorable to the rapid positioning of pots and plants and to the prompt removal of potted plants.

It is a further object of my invention to provide an organization of the general character described with suitable means for the stopping and starting of the mentioned rotating means; and a preferred embodiment of my invention may comprise means effective to position my pot-rotating and plant-rotating means favorably to the lateral opening of the same, for the positioning and removal of pots.

Other objects of my invention may be best understood from the following description of an illustrative embodiment thereof, taken in connection with the appended claims and the accompanying drawings, in which.

Fig. 2 is a vertical sectional view, the upper part thereof being taken in a substantially median plane, and the lower portion in a nearer plane, somewhat as indicated by the line 2—2 of Fig. 1.

Fig. 3 is a horizontal section, taken substantially as indicated by the line 3—3 of Fig. 1.

Fig. 6 is a sectional detail view, taken substantially as indicated by the arrow 6 of Fig. 5.

Figure 1:
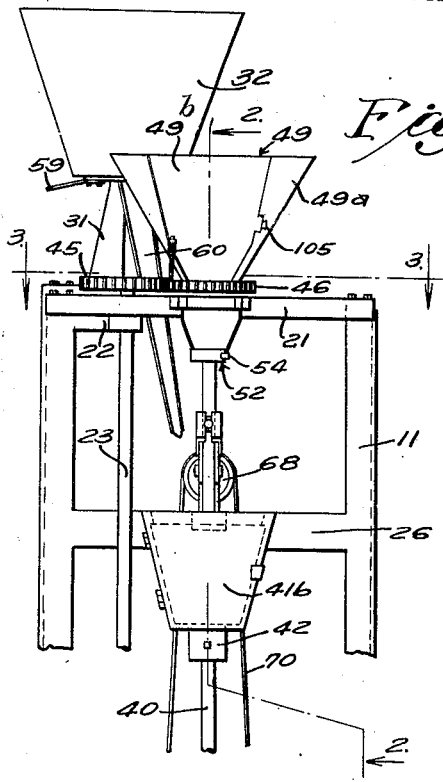
Fig. 1 is a front elevational view of the upper part of one form of machine illustrating my invention.

Referring to the details of that specific embodiment of my invention chosen for purposes of illustration, 11 and 11' may respectively be front and back sections of a cast main frame comprising horizontal elements such as overlapping side sections 12, 12', near the top thereof, and 13, 13' near the bottom thereof, the latter being shown as secured by bolts 14, and any desired supplemental side elements, 15, being provided as required.

The front frame element 11 is shown as cast integral with a bearing bracket 16, extending inwardly and downwardly from a front transverse element 17, and as integral also with bearing projections 18 and 19 extending rearward from a transverse frame element 20, above which may be disposed a removable transverse plate 21, shown as extending between the upper front corners of the described frame and as partially overlying a bearing arm 22, for the support of the upper end of a substantially vertical shaft 23, whose lower end is carried by the bearing projection 19.

The rear frame section 11' is shown as comprising a lower transverse element 24, to provide a bearing for a horizontal shaft 25, whose forward end is supported by the mentioned bracket 16; and a transverse element 26 of the rear frame 11' may be integral with a horizontally extending arm 27, carrying a bracket or brackets 28, for the support of a short horizontal shaft 29, hereinafter referred to, the upper corners of the rear frame element 11' being optionally connected by a plate 30, shown as carrying a bracket 31 for the support of a soil hopper 32.

Supported mainly or entirely by supplemental side elements 15, a motor 33, shown as secured to a plate 34, may be employed to impart rotation, as by means of a belt 35, to the shaft 25, which is shown as provided not only with a pair of tight-and-loose pulleys 36, 36', but with a fixed pulley 37, and a beveled gear 38,—the latter engaging another beveled gear 39 at the lower end of a shaft 40 extending substantially parallel with the mentioned shaft 23 and surmounted by a pot support 41. The shaft 40 is shown as extending through the bearing brackets 16 and 18 and as having the pot support 41 adjustably secured thereto, by means of a set screw 42, this construction enabling a pot to be supported and rotated at a predetermined level; and power may be transmitted from the shaft 40 to the shaft 23 by means such as gears 43 and 44, in order to transmit motion, as by way of gears 45 and 46, to a plant holder 47, disposed coaxially with the pot holder 41, and rotatable at the same speed and in the same direction therewith.

Figure 4:
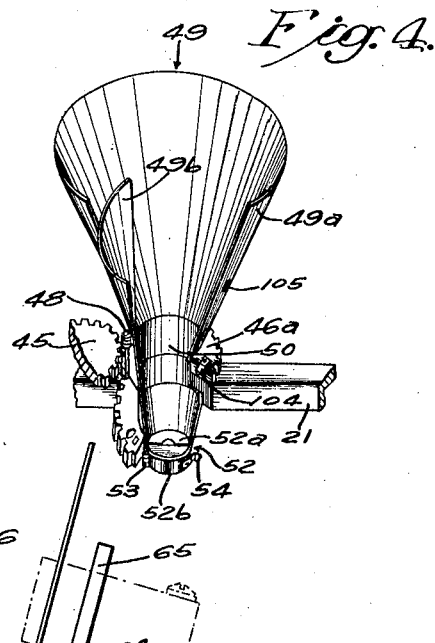
Fig. 4 is a perspective detail view showing a plant-holding and rotating means comprising a conical or funnel-like member, which is illustrated on a smaller scale in Figs. 1 and 2, and which comprises movable sections that are shown in Fig. 4 as disposed in open positions.

As best shown in Fig. 4, the gear 46 may be a sectional gear comprising a major section 46$^a$ and a minor section 46$^b$, pivoted together, as by a pin 48 rising thereabove and serving also as a pivotal connection between the sections of 49$^a$ and 49$^b$ of a conical or funnel-shaped branch holding member, the respective sections of said branch holding member being rigidly secured to the corresponding sections of the gears 46, and the latter being so disposed that a central aperture 50 is positioned coaxially with reference to both the conical member 49 and the pot holder 41, disposed immediately therebelow. One or both of the sections 49$^a$ and 49$^b$ may serve not only as a hollow shaft rotatable within an arcuate notch in the horizontal frame element 21, but as a downward extension 51 for the support of a stem-engaging member 52, shown as comprising substantially semi-circular sections 52$^a$ and 52$^b$, pivoted together at 53 and provided with a latch 54, releasably retaining the section 52$^b$ in a closed position and in engagement with the stem of the plant to be potted.

In order to feed soil into a pot, after a plant has been positioned therein and during the rotation thereof, I may employ means such as a rotary agitating or scraping element 55 shown as secured on the upper end of a shaft 56, which projects through the bottom of the hopper 32 and is provided at a suitable level with a gear 57, engageable by one of the gears on the shaft 23, as the gear 44. The soil agitator 55 may comprise fingers movable across an outlet opening 58, which may be provided with a pivoted gate 59, disposed immediately above an inclined chute 60, delivering the potting soil into any pot or other receptacle 61, supported by the pot holder 41.

Figure 5:
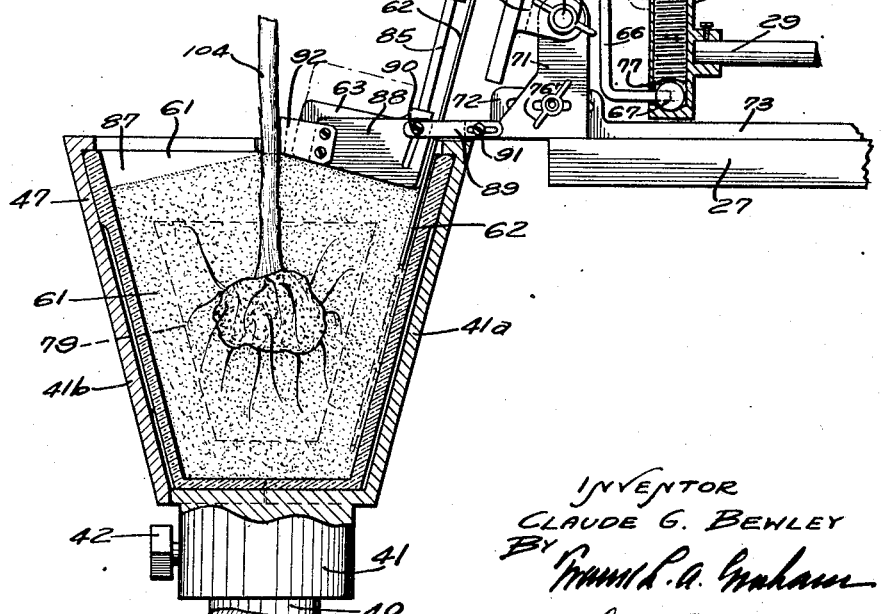
Fig. 5 is an enlarged detail view corresponding to the left central portion of Fig. 2, but showing final stages in the filling of a pot in such manner as to compact the introduced soil to a desired degree, and provide a water space thereabove.

The soil fed into a pot in the general manner described may be tamped by any suitable means, my preferred means comprising, as best shown in Figs. 2, 5 and 6, a laterally flexible tamping finger 62, reciprocable in a plane parallel with the walls of a pot and so supported that it may retreat upward during the filling of a pot, the action of this tamping finger being preferably supplemented by the use of a tamping foot 63, adapted to engage the soil only when a pot is nearly filled; and both of the mentioned tamping elements may be secured to a single tamper block 64, shown as guided by an adjustable bar 65 and as reciprocated by means comprising a bent arm 66, connected with a ball 67. This ball may be retained in a rotating head 68, on the end of the horizontal shaft 29 extending through the bearing or bearings 28 and rotated by means such as a pulley 69, shown as connected by a belt 70 with the pulley 37 on the shaft 25.

Each pot holder 41, shown as comprising a major section 41$^a$ and a minor section 41$^b$ pivoted thereto, may be adapted for use with a particular size and style of pot,—using the term pot as inclusive of receptacular elements of all types suitable to receive plants and soil: and the position and inclination of the guide 65, predetermining the position and inclination of one or both the tampers 62 and 63, may be varied, to adapt the same to use with pots of various styles and sizes, as by a lateral adjustment of a bracket 71 relatively to a slotted projection 72, shown as extending upward from a horizontal plate 73, overlying the arm or table 27; and also by rotative adjustment of said guide upon a pivot 74, extending through said bracket and through a leg 75 on said guide, wing nuts 76, 76' or their equivalents, being employed to hold the mentioned parts in their adjusted positions. The ball 67 may be secured in the head 68 by means such as a transversely extending threaded plug 76ª permitting considerable play; and a slot 77, through which the arm 66 extends, may be of sufficient amplitude to permit various angular relationships between the mentioned parts. The guided block 64 may be pivoted on the arm 66, as by means of a ball 77' yieldably held against an adjustable plug 78 by a spring 78'; and one or both of the mentioned tampers may be resiliently or yieldably secured, to the guided block 64, in any preferred manner.

For example, the tamping finger 62, adapted to work the soil down under a mass of roots, or under a body of earth 79 transferred therewith from a smaller pot, may be secured to the block 64, or its equivalent, by means comprising a leaf spring 80 movable in a guide slot 81 and tensionable (relatively to a rigid plate 82, which is slidable in said slot) by a thumb screw 83. Thus, according to the condition of the soil fed, or according to the degree of compactness desired, the finger 62, reciprocated during the rotation of a pot in which a plant is held at a desired level, may be either quickly or slowly forced upward beneath the spring 80, as soil is fed into the pot 61 and compacted to a desired degree; and a tamper foot 63, which may be reciprocated idly until the pot is nearly full, may be yieldably supported by means such as a spring 84, shown as extending between its leg 85 and a screw 86.

Depending upon whether the potted plants are to be kept on benches or are to be set, for a period, in rows in the ground, it may or may not be desirable to provide water spaces 87 above the soil therein; and the provision of such water spaces, or the removal of excess earth at the top of pots, may be effected by means such as a scraper 88, shown as supported from the bracket 71 by means of an arm 89,—one or both ends of which may be provided with adjustment screws 90, 91. In order further to steady the outer end of the scraper 88, and in order to avoid damage to the stems of the plants potted, and in order to form closed distributing space to receive the soil fed by way of the chute 60, the said outer end of scraper 88, or its equivalent, may also be secured, as by a pliable element 92, of rubber or the like, shown as extending to the lower end of said chute (see Fig. 6). Thus, assuming the pot 61 to be rotated in the direction of the arrow 93, any soil which still projects above a desired level after passing beneath the tamper 63 may be held back and ultimately scraped off onto, for example, an apron 94, (Fig. 2) downwardly terminating in a spout 95, beneath which a receptacle (not shown) may advantageously be placed, to facilitate the return of excess soil to the hopper 32, or its equivalent.

To exclude dirt, the described moving parts may be housed, to any desired extent, as by means of additional sheet metal plates 96; and, to facilitate a prompt starting and stopping of the pot holder 41 and the plant holder 47, even though the motor 33, or its equivalent, continue to rotate, I may employ any suitable means for shifting the belt 35, or its equivalent, from the "fast" pulley 36 to the "loose" pulley 36', on the shaft 25, or vice versa. In connection with my means for shifting the belt 35, I may advantageously provide means capable of checking the rotation of the pulley 36, and all parts connected therewith, after the belt 35 has been shifted therefrom; and in order that the pot holder 41 and the plant holder 47, geared together in such manner as to rotate at the same rate and respectively provided with pivoted sections in vertical alignment, may come to rest in a position favorable to the removal of potted plants and to the insertion of empty pots, I may provide a belt shifter comprising a horizontal rod or shaft 97, not only with belt-engaging fingers 98, 98', but with a brake element 99, capable of engaging the pulley 36 after the belt 35 is shifted therefrom, and optionally also with a stop element 100, incidentally movable into the path of a stop element 101, shown as projecting downward from the pivoted gear 39. When a construction of the general character here referred to is employed, a frictional brake element 102 may advantageously be resiliently supported upon the brake arm 99; and the belt-engaging fingers 98, 98' may be of such configuration and so disposed relatively to the shaft 97 that any desired braking effect may be applied, subsequently to the shifting of the belt 35, without a consequent disengagement of the said fingers; and an engagement between the stop elements 100 and 101 may be contingent upon an additional slight longitudinal movement of the shaft 97, after a desired braking effect has been obtained; and all of the described movements may be quickly effected or reversed by the suitable manipulation of an external arm 103, accessibly positioned and suitable either for manual manipulation or for connection with a foot pedal (not shown).

The operation of the respective parts of my plant potting machine having been fully indicated above, it will be understood that, upon the insertion of an empty pot (as may be conveniently done by advancing the same, with a scooping motion relatively to the tamping finger 62 and the scraper 88) followed by the positioning of a plant so that its root mass 79 is held at a desired elevation by the closing of the stem-engaging member 53, the mere initiation of a rotative movement, as by an inward thrust of the shaft 97, may be effective to swing the gear section 46$^b$ and the funnel-shaped section 49$^b$ (shown as respectively provided with catches 104 and 105) and to initiate the feeding of soil through the chute 60 and the tamping thereof. Incidentally to the rotation and filling of each pot, the tamping finger 62 reciprocates and the tamping foot 63 becomes effective in compacting the upper portion of the soil fed. The removal of any excess soil by the scraper 88 may serve as a signal for the imparting of a movement to the belt shifter shaft 97, followed by a subsequent rotation of the same, to check the rotation of the pot holder 41 and the plant holder 47, and ultimately to stop the same in a position favorable to the removal of the potted plant and the repetition of the described operations.

Although I have herein described but one complete embodiment of my invention, it will be understood that various features thereof might be independently employed, and also that numerous modifications might be made, by those skilled in the art to which this case relates, without the slightest departure from the spirit and scope of my invention, as the same is indicated above and in the following claims.

I claim as my invention:

1. A plant potting organization comprising: means for supporting a pot; means for supporting a plant to be potted; and means for the gradual filling of soil into said pot; said pot supporting means and said plant holding means being rotated, at substantially the same rate, by intermediate gearing, having a common drive.

2. A plant potting organization comprising: means for supporting a pot beneath soil feeding means; and means for tamping the said soil, said tamping means comprising a laterally flexible finger.

3. A plant potting organization comprising means for supporting a pot beneath soil feeding means; and means for tamping the said soil, said tamping means comprising a laterally flexible finger retractable during the filling of said pot.

4. A plant potting organization comprising: means for supporting a pot beneath soil feeding means; and means for tamping the said soil, said tamping means comprising both a resilient finger and an expanded foot.

5. A plant potting organization comprising: means for supporting a pot beneath soil feeding means; and means for tamping the said soil, said tamping means comprising both a resilient finger and an expanded foot, one of said tamping means being provided with a guide.

6. A plant potting organization comprising: means for supporting a pot beneath soil feeding means; and means for tamping the said soil, said tamping means being reciprocable in an inclined plane by rotating means.

7. A plant potting organization comprising: means for supporting a pot beneath soil feeding means; and means for tamping the said soil, said tamping means being removable in an inclined plane and resiliently supported from a guided block which is reciprocated by a rotating member.

8. A plant potting organization comprising: means for rotating a pot; means for feeding soil thereto; and means for striking off excess soil, during the rotation of said pot with a plant therein.

9. A plant potting organization comprising: a pot holder; a plant holder; a soil conveyor; and means for rotating said pot holder and said plant holder at substantially the same rate during the feeding of soil to said pot.

10. An organization of the general character defined in claim 9, in which said plant holder comprises a funnel-like member having a lateral opening.

11. An organization of the general character defined in claim 9, in which said plant holder comprises a sectional branch-engaging member and a sectional stem-engaging member.

12. An organization of the general character defined in claim 9, in which said plant holder comprises a sectional branch-engaging member and a sectional stem-engaging member, each of said members being composed of a section which is laterally movable to permit the insertion or removal of successive plants.

13. An organization of the general character defined in claim 9, in which said plant holder comprises a sectional branch-engaging member and a sectional stem-engaging member, between which is secured a sectional gear.

14. A plant potting organization comprising sectional means for holding a pot; sectional means for holding a plant; means for rotating said holding means together during the feeding of soil to said pot; means for checking the movement of said rotating means; and means whereby, when checked, said sectional means are stopped with their removable sections accessibly disposed.

15. A plant potting organization comprising: means for holding a plant upright at a desired level above the bottom of a pot during the feeding of soil thereto; tamping means; and means for disposing of any excess of soil fed.

In testimony whereof, I have hereunto set my hand at Los Angeles, California, this 28 day of July, 1925.

CLAUDE G. BEWLEY.

CERTIFICATE OF CORRECTION.

Patent No. 1,664,913.　　　　　　　　　　　　　　Granted April 3, 1928, to

CLAUDE G. BEWLEY.

It is hereby certified that in the assignment in the above numbered patent the christian name of the second mentioned member of the co-partnership was erroneously written and printed as "Francis", whereas said name should have been written and printed as "Frances" as shown by the records of assignments in this office; and that the said Letters Patent should be read with this correction therein that the same may conform to the record of the case in the Patent Office.

Signed and sealed this 15th day of May, A. D. 1928.

(Seal)

M. J. Moore,
Acting Commissioner of Patents.